United States Patent
Kuklo

[19]

[11] Patent Number: 5,924,335

[45] Date of Patent: Jul. 20, 1999

[54] CONCENTRIC RING FLYWHEEL WITH HOOKED RING CARBON FIBER SEPARATOR/TORQUE COUPLER

[75] Inventor: Thomas C. Kuklo, Oakdale, Calif.

[73] Assignee: The Regents of the University of California, Oakland, Calif.

[21] Appl. No.: 08/316,685

[22] Filed: Sep. 30, 1994

[51] Int. Cl.[6] ............................................. F16F 15/30
[52] U.S. Cl. ............................................. 74/572
[58] Field of Search ................... 74/572; 464/89, 464/92

[56] References Cited

U.S. PATENT DOCUMENTS

| | | | |
|---|---|---|---|
| 2,051,442 | 8/1936 | Geyer | 464/92 |
| 2,671,488 | 3/1954 | Christensen | 464/89 X |
| 3,058,321 | 10/1962 | Aske | 464/89 |
| 3,683,216 | 8/1972 | Post | 310/67 |
| 3,741,034 | 6/1973 | Post | 74/572 |
| 4,241,620 | 12/1980 | Pichl et al. | 74/572 X |
| 4,787,878 | 11/1988 | Nikkel | 464/89 X |
| 4,962,677 | 10/1990 | Withers | 74/572 X |
| 5,024,120 | 6/1991 | Andra | 74/572 X |

OTHER PUBLICATIONS

UCRL–JC–110861, "A High Efficiency Electromechanical Battery", R.F. Post, et al., Jun. 11, 1992.

*Primary Examiner*—John A. Jeffery
*Assistant Examiner*—Mary Ann Battista
*Attorney, Agent, or Firm*—L. E. Carnahan

[57] ABSTRACT

A concentric ring flywheel with expandable separators, which function as torque couplers, between the rings to take up the gap formed between adjacent rings due to differential expansion between different radius rings during rotation of the flywheel. The expandable separators or torque couplers include a hook-like section at an upper end which is positioned over an inner ring and a shelf-like or flange section at a lower end onto which the next adjacent outer ring is positioned. As the concentric rings are rotated the gap formed by the differential expansion there between is partially taken up by the expandable separators or torque couplers to maintain torque and centering attachment of the concentric rings.

6 Claims, 1 Drawing Sheet

CONCENTRIC RING FLYWHEEL WITH HOOKED RING CARBON FIBER SEPARATOR/TORQUE COUPLER

The United States Government has rights in this invention pursuant to Contract No. W-7405-ENG-48 between the United States Department of Energy and the University of California for the operation of Lawrence Livermore National Laboratory.

BACKGROUND OF THE INVENTION

The present invention relates to flywheels, particularly to concentric, multi-ring rotors or flywheels, and more particularly to an expandable separator/torque coupler intermediate adjacent concentric rings of a rotor, such as a flywheel.

The use of flywheels for the storage of energy has long been known, and the application of flywheels for vehicular use was initiated decades ago. The storage of energy in a flywheel to power an electric vehicle was utilized, for example, over forty years ago to operate an electric-drive bus, known as the Gyrobus. In this electric-drive bus, occasional charging stops were required for an electric motor to spin up a heavy steel flywheel, and in motion this flywheel provided energy to power the motor connected to it, which then operated as a generator, to provide electricity to drive other electric motors that turned the wheels of the bus. Using the reversibility of the generator-motor, in slowing down or on downhill runs the bus spun up the flywheel, thus providing a "regenerative" braking action that at the same time recovered some of the energy expended in traction. The main drawbacks were the cumbersome steel flywheel and the cumbersome and expensive power conversion equipment.

The use of flywheels in the form of an electromechanical battery (EMB) was extensively researched in the 1970–1980 time period for use in electric vehicles. It was determined from these efforts that the addition of one or two EMB's to their conventional battery system could greatly improve the performance of the electric vehicles.

With the development of strong, lightweight materials and solidstate electronics, EMB's were again considered for electric vehicle use, as well as for large stationary application. Such materials included fiber composites, with the flywheels which included contrarotating rotors each being composed of multiple, concentric rings. For example, compact cylindrical flywheels using unidirectionally wound flexible fibers were developed, and U.S. Pat. Nos. 3,683,216 issued Aug. 8, 1972 to R. F. Post, and No. 3,741,034 issued Jun. 26, 1973 to S. F. Post exemplify flywheels with multi-ring, contrarotating rotors.

Further research and development efforts have been directed to fiber composite flywheels using a multi-ring design. For example, one approach consisted of separate thin-walled cylinders or rings fabricated of filament-wound unidirectional fibers embedded in an epoxy matrix, and the cylinders were coupled together by elastic elements or spring-like mechanical elements that transmit torques but did not transmit strong radial forces. Such an approach, along with an extensive history of flywheel development is set forth in a paper UCRL-JC-110861, "A High Efficiency Electromechanical Battery", R. F. Post et al., Jun. 11, 1992.

Concentric ring or multi-ring flywheels have unique features that minimize radial tensile stress allowing higher speeds and increased stored energy. However, a difficult aspect of this methodology is that the concentric rings expand differentially with different radius rings. This differential expansion between rings requires expandable separators to take up the gap between adjacent rings. These separators are required to be dynamic components. While elastic and spring-like elements were utilized to interconnect the cylinders or rings of the flywheel described in the above-referenced paper UCRL-JC-110861, such did not effectively provide for the differential expansion of the various rings, or maintain a torque and centering attachment between the adjacent rings. Thus, a need exists for a simple, yet effective means to resolve the problem associated with differential expansion of the various rings in a concentric rotor or flywheel.

The present invention provides a solution to this problem by utilizing an expandable separator/torque coupler between adjacent rings of a concentric ring rotor or flywheel. This is accomplished by an expandable hook ring carbon fiber separator/torque coupler, wherein a hook ring section thereof is positioned over an upper end of an inner ring of a multi-ring arrangement, and wherein a flanged section thereof is positioned under and adjacent outer ring, such that the expandable separator/torque coupler maintains a torque and centering attachment between the adjacent concentric rings, thereby reducing the adverse effects resulting from differential expansion of different radius concentric rings.

SUMMARY OF THE INVENTION

It is an object of the present invention to provide a means for at least reducing problems associated with differential expansion of different radius, concentric rings.

A further object of the invention is to provide an expandable separator between adjacent rings of a concentric ring rotor, such as a flywheel.

Another object of the invention is to provide a separator/torque coupler for a concentric ring flywheel.

Another object of the invention is to provide a carbon fiber separator/torque coupler between adjacent rings of a rotating concentric ring mechanism which maintains a torque and centering attachment between the adjacent rings.

Other objects and advantages will become apparent from the following description and accompanying drawings. The invention is basically an expansion separator/torque coupler for a mechanism utilizing concentric rotating rings. More specifically the invention is directed to a flywheel utilizing concentric rings and expandable means secured to adjacent concentric rings for eliminating a gap produced between the concentric rings due to differential expansion of the rings. Specifically, the invention involves a hooked ring carbon fiber separator/torque coupler mounted between two adjacent concentric rings of a flywheel which maintains torque and centering attachment between the adjacent rings.

BRIEF DESCRIPTION OF THE DRAWINGS

The accompanying drawings, which are incorporated into and form a part of the disclosure, illustrate an embodiment of the invention and, together with the description, serve to explain the principles of the invention.

DETAILED DESCRIPTION OF THE INVENTION

Figure 1:
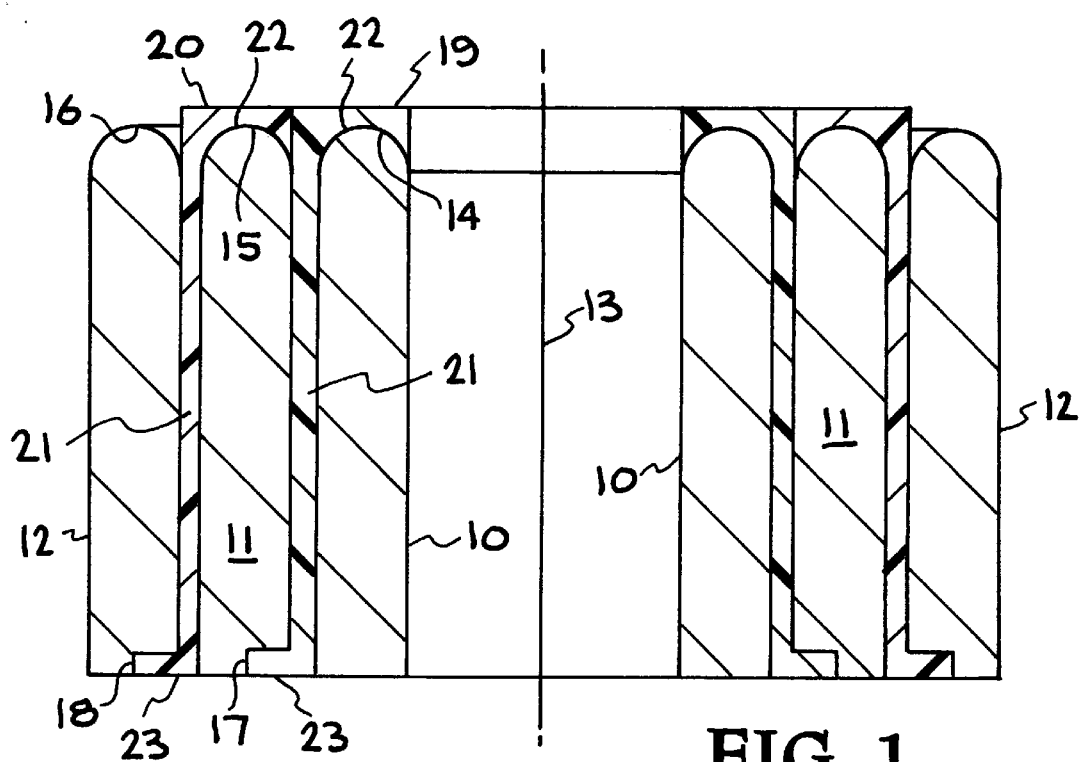
FIG. 1 is a partial cross-sectional view of a concentric ring apparatus at rest, and which incorporates the separators of the invention.

The present invention is directed to an expandable separator/torque coupler located between each pair of concentric rings of a rotor, such as used in a concentric ring flywheel. While concentric ring flywheels have unique features that minimize radial tensile stress allowing higher speeds and increased stored energy, the concentric rings expand differentially with different radius rings, thereby forming gaps between the adjacent rings. This differential expansion between the concentric rings requires expandable separators to take up the gap between the adjacent rings. The present invention provides an expandable separator/torque coupler for concentric rings, which takes up the gap there between and maintains a torque and centering attachment. While this invention is particularly applicable to concentric ring flywheels, it may be utilized in other rotor-type applications involving concentric rings which expand differentially due to the different radius rings.

The invention involves thin-wall carbon fiber separator shells with certain end construction which function to hold in place multiple rings and allow for differential expansion of such rings as they are spinning up to speed. The entire assembly, as shown in the drawings, will transmit torque and is self centering. Also, there is a minimum of stress concentration when operating, and is stress free at rest.

Figure 2:
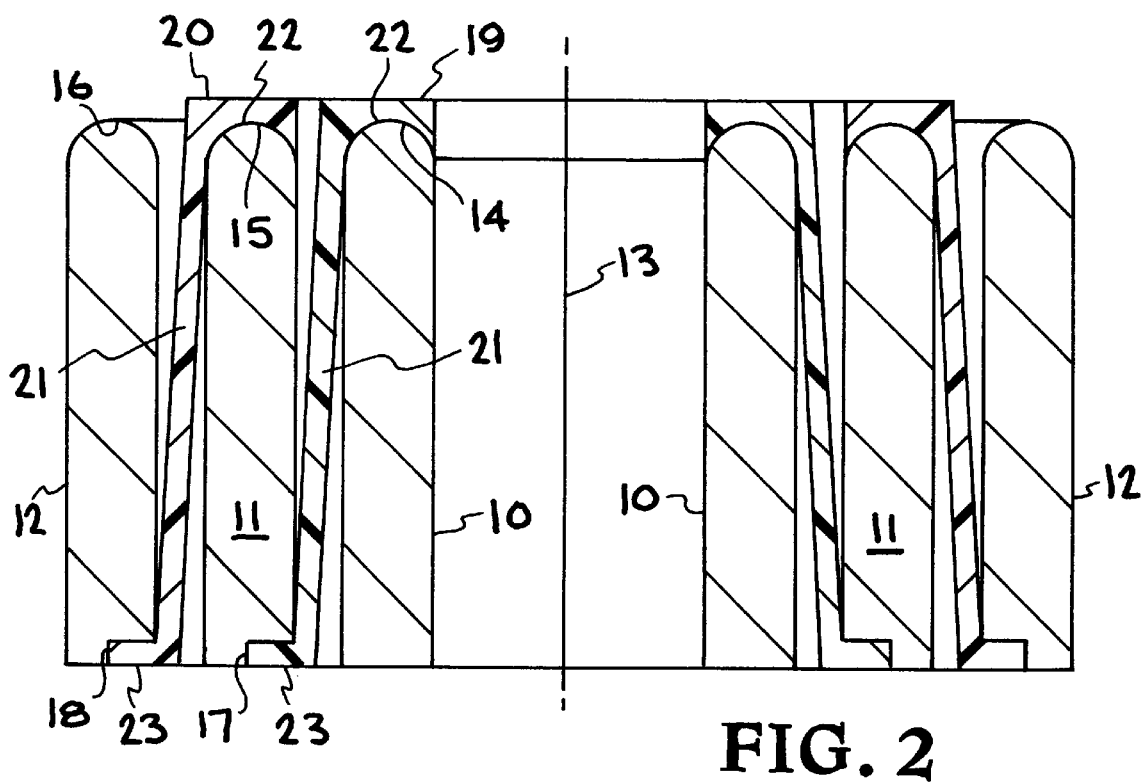
FIG. 2 is a view similar to FIG. 1, but with the apparatus rotating at a desired speed, illustrating the expansion capability of the separator of the invention.

Referring now to the drawings, FIG. 1 illustrates a concentric ring rotor at rest, while FIG. 2 illustrates the rotor at speed, showing radial expansion and separator cross coupling. The embodiment illustrated in the drawings utilizes three concentric rings which rotate about an axis or centerline, with only a cross-section of each of the concentric rings being illustrated for simplicity.

As illustrated in the drawings, the concentric ring rotor assembly comprises rings 10, 11 and 12 which extend around an axis or centerline 13. Each of the rings 10–12 having a curved upper end of a selected radius, indicated at 14, 15 and 16, respectively, with each of rings 10 and 12 being provided with a cut-away or step, indicated at 17 and 18, on the lower inner end thereof. A pair of separators, which comprise thin-walled rings, generally indicated at 19 and 20, are positioned intermediate rings 10–11 and 10–12. Each of separators 19 and 20 include a straight body section 21, a hook or curved upper end 22, and a radially outwardly extending shelf or flanged configured lower end 23. The curved upper ends 22 of separators 19 and 20 each having a matching radius to that of the upper ends of rings 10 and 11, and the flanged lower end 23 of separators 19 and 20 each having a thickness and width to correspond to the configuration of the cut-away or steps 17 and 18 of rings 10 and 12. As seen in the drawings, the hook or curved upper ends 22 of separators 19 and 20 are positioned over the curved upper ends 14 and 15 of concentric rings 10 and 11, while the step or flanged lower ends 23 of separators 19 and 20 extend into the cut-aways or steps 17 and 18 of rings 10 and 12, such that rings 10 and 12 sit on the lower ends 23 of separators 19 and 20.

Upon spinning up of the rotor assembly of FIG. 1 to speed, as shown in FIG. 2, the ring 11 will expand more than the ring 10 and separator 19 will expand with ring 11 for the full length of the separator except at the region of the hook or curved end 22 positioned on the upper end 14 of ring 10, which due to the hook attachment cannot expand more than ring 10. This maintains a torque and centering attachment between the rings 10 and 11. Similarly, ring 12 will expand more than ring 11 and separator 20 will expand with ring 12 for the full length thereof except for the hook end 22 positioned on the upper end 15 of ring 11, and thus maintain a torque and centering attachment between rings 11 and 12. Thus, separators 19 and 20 provide for radial expansion of the rings 10, 11 and 12, while also providing cross coupling there between, thereby taking up the gaps caused by the differential expansion between the rings due to the different radius of the adjacent rings.

By way of example, the separators 19 and 20 may be constructed of carbon fiber, glass fiber, metal fiber, and epoxy resin having a length of 2 inches to 12 inches, with the body section 21 having a thickness of $\frac{1}{16}$ inch to $\frac{1}{4}$ inch, with the hook or curved upper end 22 having a radius of 0.1 inch to 1.5 inch, and the flanged or lower end 23 having a width of 0.062 inch to 0.250 inch, and thickness of 0.062 inch to 0.250 inch. It is understood of course that the parameters and configurations of the various sections of the separators are dependent on the configurations and parameters of the associated concentric rings. For example, if the upper ends of the rings have a flat or pointed configuration, the hook or curved upper end of the separators would require a similar configuration. Likewise, the configuration of the flanged or stepped lower end of the separators would be configured to cooperate the cut-aways or steps formed in the lower end of the rings, such that the rings would sit on the lower end of the separators. Also, while this embodiment has illustrated three rings and two separators, two or multiple rings and one or multiple separators could be utilized.

It has thus been shown that the present invention provides a means by which the differential expansion problem of concentric rings is minimized, while maintaining a torque and centering attachment between the adjacent rings. Thus, this invention provides an expansion separator/torque coupler for concentric ring apparatus, such as flywheels.

While a particular embodiment has been illustrated and described, and materials, parameters, etc. have been set forth to set forth and exemplify the invention and its operation, such are not intended to be limiting. Modifications and changes may become apparent to those skilled in the art, and it is intended that the invention be limited only by the scope of the appended claims.

I claim:

1. In a concentric ring rotor assembly, the improvement comprising:

at least one expandable separator/torque operatively connected between at least two adjacent axially spaced concentric rings of the rotor assembly, said expandable separator/torque coupler comprising a ring member having a body section, an upper end section in contact with an inner concentric ring of said pair of concentric rings, and a lower end section in contact with an adjacent outer concentric ring of said pair of concentric rings, said ring member being configured such that said upper end section thereof extends toward said inner concentric ring, and said lower end section thereof extends toward said adjacent outer concentric ring, and said upper end section being configured to cooperate with an outer end section of said inner concentric ring, and said lower end section being configured to cooperate with a cut-away in an inner end section of said adjacent outer concentric ring.

2. The improvement of claim 1, wherein said upper end section of said ring member includes a surface configured to cooperate with and extend over said outer end section of said inner concentric ring.

3. The improvement of claim 2, wherein said surface of said upper end section of said ring member is of a curved configuration.

4. The improvement of claim 1, wherein said lower end section of said ring member includes an outwardly extending section configured to cooperate with said cut-away in said inner end section of said adjacent outer concentric ring such that said outer concentric ring sits on said outwardly extending section of said ring member.

5. In a concentric ring rotor assembly, the improvement comprising:

means for at least reducing problems associated with differential expansion of axially spaced concentric rings of different radius;

said means comprising an expandable separator having an upper end and a lower end interconnected by a body section, said upper end being connected to an upper end of an inner ring of said axially spaced concentric rings and an adjacent outer ring of said axially spaced concentric rings being connected to said lower end;

each of said concentric rings thereof except an inner concentric ring being provided with a cut-away section on at least one side of an inner end thereof, and said lower end of said expandable separator including a flanged section, whereby said flanged section of said expandable separator extends into and cooperates with said cut-away section of said concentric ring.

6. An expandable separator/torque coupler adapted to be positioned between adjacent axially spaced concentric rings of a concentric ring rotor assembly for at least reducing problems associated with expansion of concentric rings of different radius, comprising:

a ring member having an outer end section and an inner end section;

said outer end section extending toward an associated first concentric ring;

said inner end section extending toward an associated second concentric ring;

each of said outer and inner end sections of said ring member being configured to contact and cooperate with an associated concentric ring;

at least two axially spaced concentric rings, said outer end section of said ring member being configured to extend over and cooperate with an outer end of an inner ring of said axially spaced concentric rings; and said inner end section of said ring member including an outwardly extending flange section positioned in a cut-away inner end of an adjacent outer concentric ring of said two axially spaced concentric rings so that said adjacent outer concentric ring sits on said flange section of said inner end section of said ring member.

* * * * *